US008820819B2

(12) United States Patent
Tamaki

(10) Patent No.: US 8,820,819 B2
(45) Date of Patent: Sep. 2, 2014

(54) VEHICLE FLOOR FRAME STRUCTURE

(75) Inventor: Hideyuki Tamaki, Hamamatsu (JP)

(73) Assignee: Suzuki Motor Corporation (JP)

( * ) Notice: Subject to any disclaimer, the term of this patent is extended or adjusted under 35 U.S.C. 154(b) by 4 days.

(21) Appl. No.: 13/232,616

(22) Filed: Sep. 14, 2011

(65) Prior Publication Data

US 2012/0080907 A1 Apr. 5, 2012

(30) Foreign Application Priority Data

Oct. 1, 2010 (JP) ................................. 2010-223814

(51) Int. Cl.
*B62D 25/20* (2006.01)

(52) U.S. Cl.
CPC ..................................... *B62D 25/20* (2013.01)
USPC ................ 296/193.07; 296/204; 296/187.08; 296/65.05

(58) Field of Classification Search
USPC ..................... 296/193.07, 187.08, 204, 65.05
See application file for complete search history.

(56) References Cited

U.S. PATENT DOCUMENTS

| | | | |
|---|---|---|---|
| 6,688,676 B1 * | 2/2004 | Sato ........................ | 296/187.05 |
| 2006/0214473 A1 * | 9/2006 | Ito et al. .................. | 296/193.07 |

FOREIGN PATENT DOCUMENTS

| | | |
|---|---|---|
| CN | 1830716 A | 9/2006 |
| JP | 10-297541 | 11/1998 |
| JP | 2001-322567 | 11/2001 |
| JP | 2005-219521 | 8/2005 |
| JP | 2007-216903 | 8/2007 |
| JP | 2008-013078 | 1/2008 |
| JP | 2009-012677 | 1/2009 |

OTHER PUBLICATIONS

First Chinese Office Action corresponding to Chinese Application No. 201110302983.0 issued Sep. 22, 2013.

Office Action corresponding to Japanese Application No. 2010-223814 issued Apr. 17, 2014.

* cited by examiner

*Primary Examiner* — Glenn Dayoan
*Assistant Examiner* — Melissa A Black
(74) *Attorney, Agent, or Firm* — Myers Bigel Sibley & Sajovec, P.A.

(57) ABSTRACT

In a vehicle floor frame structure, side members 2 each include a floor side member 21 and a rear side member 22; the floor side member 21 is disposed on a main floor panel 11; the rear side member 22 is disposed on a rear floor panel 12; a reinforcement 3 is stacked on the floor side member 21 in a vertical direction with the main floor panel 11 interposed therebetween; an upper surface 3*a* of the reinforcement 3 becomes higher toward the rear of the vehicle body; a front portion 3*b* and lower portions of side surfaces 3*c* of the reinforcement 3 are joined to the main floor panel 11; a rear end portion 3*d* of the reinforcement 3 is joined to the vertical wall 13*a* in a front portion of the rear floor panel 12; a closed section space S1 enclosed by the main floor panel 11, a front portion 13 of the rear floor panel 12, and the reinforcement 3 is formed in a side view; a lower surface portion 21*b* of a rear end of the floor side member 21 becomes higher toward the main floor panel 11; and the upper surface 3*a* of the reinforcement 3 and the lower surface portion 21*b* of the floor side member 21 are inclined at almost the same angles and are formed to have a monotonous cross section in a side view.

4 Claims, 3 Drawing Sheets

12
13
13a
11
22
3d
32
3a
31
4b
4
4a
S2
3
S1
21b
21
3b

VEHICLE FLOOR FRAME STRUCTURE

CROSS-RELATED APPLICATIONS

This application claims priority from Japanese Patent Application No. 2010-223814; filed Oct. 1, 2010, the disclosure of which is incorporated herein by reference in its entirety.

BACKGROUND OF THE INVENTION

The present invention relates to a vehicle floor frame structure that is provided in a lower portion of a vehicle body, and which includes a floor panel, side members, and the like.

In a common vehicle floor frame structure, a floor panel is provided in an entire lower portion of a vehicle body, and side members extending in a vehicle body front-and-rear direction are provided on both left and right sides in a vehicle body width direction of the floor panel. Of these, the side members are frame members extending over almost the entire length of the vehicle body in the vehicle body front-and-rear direction, and are important in securing the rigidity of the vehicle body. Moreover, the side members play a principal role in transmitting a load input from the front side of the vehicle body to members at the rear side of the vehicle body.

In this respect, in order to efficiently transmit a load from the front side of the vehicle body to the members at the rear side of the vehicle body, it is important to employ a structure in which the side members positioned on both the left and right sides extend with a distance therebetween maintained constant without being bent locally. This structure enables the floor frame structure to have a necessary rigidity, and lightweight members to be employed for the side members and the like.

However, in a basic frame structure of a small vehicle with a compact design, the distance between the side members in the vehicle body width direction is also small because of a small vehicle width. Meanwhile, there is a structure in which rigid members are disposed to concentrate on an inner side in the vehicle body width direction to effectively receive a load input from the front side of the vehicle body. When such a structure is employed, the distance between the side members in the vehicle body width direction tends to be small.

Nevertheless, in the vicinity of a rear-floor, rear side members in the rear side of the vehicle body are required to be positioned on outer sides in the vehicle body width direction for the purpose of avoiding interference with members such as a fuel tank disposed in the rear side of the vehicle body, or attaching rear tire suspensions. For this reason, a conventional floor frame structure employs side members each having a vehicle body rear side shaped to curve outward further from the center in the vehicle width direction or is provided with additional members extending in the vehicle body front-and-rear direction. With such a floor frame structure, a load input from the front side of the vehicle body is transmitted to the rear side members at the rear side of the vehicle body, so that the load is absorbed by the vehicle body as a whole.

Meanwhile, the basic frame structure of a small vehicle with a compact design is required to avoid increase in weight due to additional members. In this respect, in a type of conventional frame structure, each front side member is curved outward to be continuous to a side member of a main floor, and the side member of the main floor is maintained at the outer side position in a vehicle body and is continuous to a rear side member at the rear of the vehicle body (see, for example, JP 2009-12677 A).

In another type of conventional frame structure, front side members are continuous to side members of a main floor, while maintaining the distance in the vehicle body width direction almost the same, and the side members of the main floor are curved outward in the vehicle body to be continuous to rear side members at the rear of the vehicle body (see, for example, JP 2005-219521 A).

Moreover, in still another type of conventional frame structure, each side member is divided into a floor side member for a main floor and a rear side member for a rear floor, a rear portion of the floor side member is connected to the rear floor without being curved, and the rear side member is provided at a position shifted from the floor side member in the vehicle body width direction (see, for example, JP 2008-13078 A).

In the conventional floor frame structure shown in JP 2009-12677 A, however, a curved portion is formed in the front side member in the front side of the vehicle body which is required to absorb a large load. Hence, it is also necessary to reinforce the curved portion, and to design the floor frame structure so that the side member may not bend in the curved portion when being deformed in any pattern.

Meanwhile, especially in the case of the basic frame structure of a small vehicle with a compact design, the conventional floor frame structure shown in JP 2005-219521 A sometimes lacks necessary frame rigidity, because the length in the vehicle body front-and-rear direction of the curved portions of the side members is so short that the side members are sharply curved outward. Moreover, there is a problem that press molding of such side members is difficult, which leads to decrease in productivity.

Moreover, in the conventional floor frame structure shown in JP 2008-13078 A, a load inputted from the front side of the vehicle body is transmitted from the front side members to the floor side members, but is not transmitted to the rear side members in the rear side of the vehicle body. In other words, the load is received by the front portion of the rear floor, and stops at the front portion. As a result, the load tends to concentrate at the front portion of the rear floor, which raises a concern about buckling deformation of the rear floor. For this reason, additional reinforcing means needs to be provided at the position of the rear floor.

SUMMARY OF THE INVENTION

The present invention has been made in view of such circumstances, and an object of the present invention is to provide a vehicle floor frame structure capable of dispersing a load from a front side of a vehicle body by smoothly transmitting the load from a floor side member to a rear floor panel in the rear side of the vehicle body, and preventing the buckling deformation of the front portion of the rear floor panel while avoiding stress concentration in a front portion of the rear floor panel, In order to solve the problems of the foregoing conventional techniques, the present invention provides a vehicle floor frame structure including: a floor panel provided in a lower portion of a vehicle body and having a main floor panel and a rear floor panel; and side members being provided on both sides of the floor panel in a vehicle body width direction, and each having a floor side member and a rear side member which extend in a vehicle body front-and-rear direction, the floor side member being provided on the main floor panel, the rear side member being provided on the rear floor panel, in which: a reinforcement extending in the vehicle body front-and-rear direction is disposed above each of the floor side members in a vehicle body vertical direction with the main floor panel interposed therebetween in a stacked manner; an upper surface of the reinforcement is formed to become higher toward a rear of the vehicle body; a front portion and lower portions of longitudinal direction side surfaces of the reinforcement are joined to an upper surface of the main floor panel, and a rear end of the reinforcement is joined to a vertical wall formed in a front portion of the rear floor panel, whereby a first closed section space enclosed by the main floor panel, the front portion of the rear floor panel, and the reinforcement is formed in a side view; and a lower surface of a rear end of the floor side member is formed to become gradually higher toward the main floor panel, and an upper surface of the reinforcement and the lower surface at the rear end of the floor side member are inclined at almost the same angles and are formed to have a monotonous cross-sectional shape in a side view.

Moreover, in the present invention, a rear-floor front cross member extending in the vehicle body width direction is provided behind the front portion of the rear floor panel in the vehicle body front-and-rear direction, the rear-floor front cross member is joined to a lower surface of the rear floor panel to form a second closed section space in a side view, the second closed section space enclosed by the rear floor panel and the rear-floor front cross member, and the second closed section space is disposed adjacent to the first closed section space.

Additionally, in the present invention, the first closed section space and the second closed section space are formed to have cross-sectional shapes which change continuously in the vehicle body front-and-rear and vertical directions.

Furthermore, in the present invention, the cross-sectional shape of the reinforcement taken along the vehicle body width direction is formed in a hat shape, lower flanges on both left and right sides of the reinforcement are disposed at the same positions as flanges formed in an upper portion of the floor side member, respectively, when viewed in the vehicle body vertical direction, and each of the lower flanges of the reinforcement, the main floor panel, and the corresponding one of the flanges of the floor side member are joined together, while forming a three-layer stack.

Furthermore, in the present invention, lateral flanges extending in the vehicle body width direction are formed on both left and right sides of a rear end portion of the reinforcement, respectively, a flange extending downward in the vehicle body is formed in a front end portion of the rear-floor front cross member, and each of the lateral flanges of the reinforcement, the vertical wall of the front portion of the rear floor panel, and the flange of the rear-floor front cross member are joined together, while forming a three-layer stack.

Furthermore, in the present invention, the reinforcement is provided with an attachment portion for a rear seat.

As described above, the vehicle floor frame structure according to the present invention includes the floor panel provided in the lower portion of the vehicle body and having the main floor panel and the rear floor panel; and the side members being provided on both sides of the floor panel in the vehicle body width direction, and each having the floor side member and the rear side member which extend in the vehicle body front-and-rear direction, the floor side member being provided on the main floor panel, the rear side member being provided on the rear floor panel, wherein: the reinforcement extending in the vehicle body front-and-rear direction is disposed above each of the floor side members in the vehicle body vertical direction with the main floor panel interposed therebetween in the stacked manner; the upper surface of the reinforcement is formed to be higher toward the rear of the vehicle body, the front portion and the lower portions of the longitudinal direction side surfaces of the reinforcement are joined to the upper surface of the main floor panel, and the rear end of the reinforcement is joined to the vertical wall formed in the front portion of the rear floor panel, whereby the first closed section space enclosed by the main floor panel, the front portion of the rear floor panel, and the reinforcement is formed in the side view, and the lower surface of the rear end of the floor side member is formed to become gradually higher toward the main floor panel, and the upper surface of the reinforcement and the lower surface at the rear end of the floor side member are inclined at almost the same angles and are formed to have the monotonous cross-sectional shape in side view. Therefore, the closed section space in a side view is fixedly formed by the rear end of the floor side member and the reinforcement and extends toward the front portion of the rear floor panel. The presence of the closed section space can increase the rigidity of the front portion of the rear floor panel.

Accordingly, when a load from the front side of the vehicle body is applied to the main floor panel and the floor side members, the floor frame structure of the present invention can smoothly transmit the load on the floor side members to the rear floor panel in the rear side of the vehicle body to disperse the load from the front side of the vehicle body over the rear floor panel in the rear side of the vehicle body. As a result, the floor frame structure can prevent the buckling deformation of the front portion of the rear floor panel due to the load from the front side of the vehicle body while avoiding stress concentration in the front portion of the rear floor panel.

In addition, in the present invention, the rear-floor front cross member extending in the vehicle body width direction is provided behind the front portion of the rear floor panel in the vehicle body front-and-rear direction, the rear-floor front cross member is joined to a lower surface of the rear floor panel to form a second closed section space in a side view, the second closed section space enclosed by the rear floor panel and the rear-floor front cross member, and the second closed section space is disposed adjacent to the first closed section space. Accordingly, the load on the floor side member can be efficiently transmitted to the closed section spaces having a high rigidity around the front portion of the rear floor panel. Moreover, owing to the closed section spaces around the front portion of the rear floor panel extending in the vehicle body width direction, the load from the front side of the vehicle body is dispersed over many members in the rear side of the vehicle body. Therefore, the vehicle floor frame structure can efficiently absorb the load from the front side of the vehicle body.

Moreover, in the present invention, the first closed section space and the second closed section space are formed to have cross-sectional shapes which change continuously in the vehicle body front-and-rear and vertical directions. Accordingly, these closed section spaces act more cooperatively, so that the load from the front side of the vehicle body can be dispersed and absorbed further efficiently.

Furthermore, in the present invention, lower flanges on both left and right sides of the reinforcement are disposed at the same positions as flanges formed in an upper portion of the floor side member, respectively, when viewed in the vehicle body vertical direction, and each of the lower flanges of the reinforcement, the main floor panel, and the corresponding one of the flanges of the floor side member are joined together, while forming a three-layer stack. Accordingly, these members can be connected together by spot welding, while forming a three-layer stack, which guarantees reliable welding. Therefore, the peeling of the members at the welding points can be prevented. As a result, the vehicle floor frame structure can absorb the load from the front side of the vehicle body while reliably retaining the cross-sectional shapes of the closed section spaces.

Furthermore, in the present invention, lateral flanges extending in the vehicle body width direction are formed on both left and right sides of a rear end portion of the reinforcement, respectively, a flange extending downward in the vehicle body is formed in a front end portion of the rear-floor front cross member, and each of the lateral flanges of the reinforcement, the vertical wall of the front portion of the rear floor panel, and the flange of the rear-floor front cross member are joined together, while forming a three-layer stack. Accordingly, as in the case with the above-described aspect, these members can be connected together by spot welding, while forming a three-layer stack, which guarantees reliable welding. Therefore, the peeling of the members at the welding points can be prevented. As a result, the vehicle floor frame structure can absorb the load from the front side of the vehicle body while reliably retaining the cross-sectional shapes of the closed section spaces.

Furthermore, in the present invention, the reinforcement is provided with an attachment portion for a rear seat. Accordingly, even in a case in which a large load is applied to the attachment portion for the rear seat due to application of a load from the front side of the vehicle body accompanied by inertial force due to the weight of the rear seat and the weight of an occupant, the reinforcement having a high rigidity can reliably receive and absorb a load from the rear seat.

DETAILED DESCRIPTION OF PREFERRED EMBODIMENTS

Figure 1:
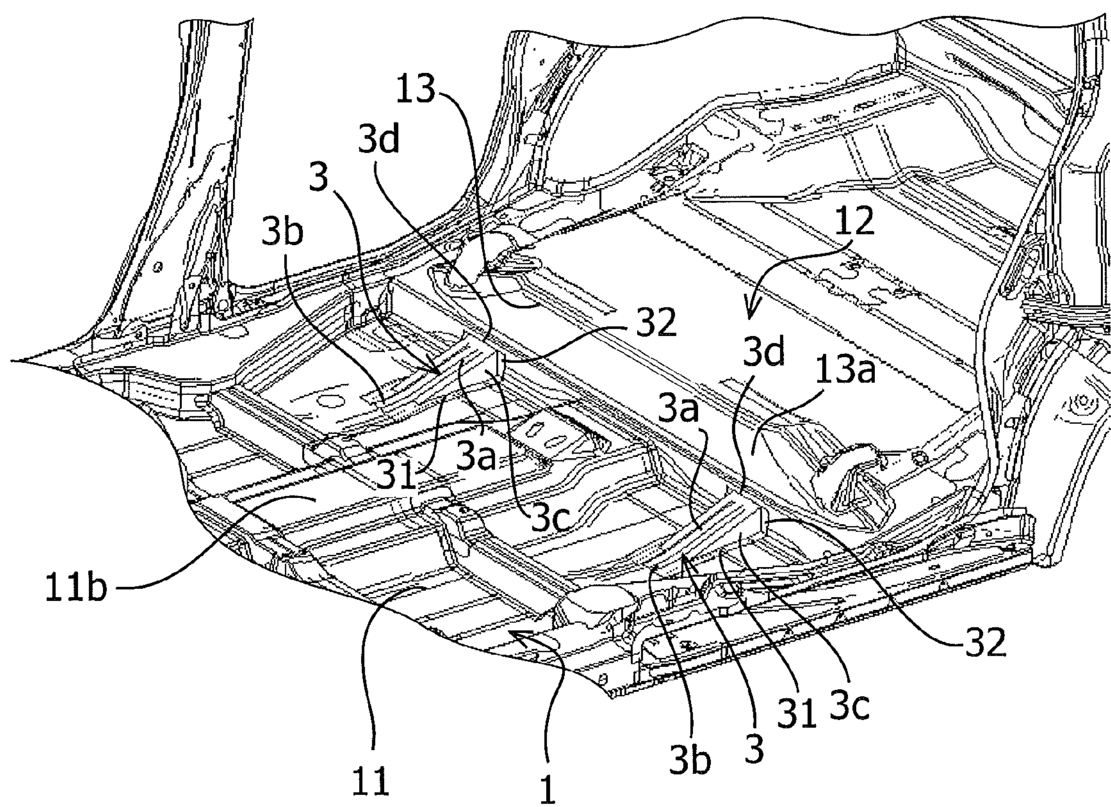
FIG. 1 is a perspective view of an interior side of a vehicle to which a floor frame structure according to an embodiment of the present invention is applied and which is viewed obliquely from above and in front of a vehicle body, and shows floor panels and reinforcements.

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms “a”, “an” and “the” are intended to include the plural forms as well, unless the context clearly indicates otherwise.

Unless otherwise defined, all technical and scientific terms used herein have the same meaning as commonly understood by one of ordinary skill in the art to which this invention belongs.

FIGS. 1 to 5 show a vehicle floor frame structure according to the embodiment of the present invention.

As shown in FIGS. 1 to 4, the vehicle according to the embodiment of the present invention is an automobile of a 4-door sedan type. The vehicle floor frame structure of this type includes a floor panel 1 provided over an entire lower portion of the vehicle body, and a pair of left and right side members 2 provided on both left and right sides of the floor panel 1 in a vehicle width direction. The floor panel 1 includes a main floor panel 11 and a rear floor panel 12 which are disposed continuously to each other in a vehicle body front-and-rear direction. The rear floor panel 12 is placed at a position one step higher than the main floor panel 11. For this reason, a front portion 13 positioned in front of the rear floor panel 12 in the vehicle body front-and-rear direction is bent downward in the vehicle body to form a vertical wall 13*a*. The vertical wall 13*a* is bent to form a lower end portion which extends almost horizontally and is joined to a rear end portion 11*a* of the main floor panel 11. Note that a floor tunnel 11*b* which has a convex shape protruding toward the vehicle interior, and which extends in the vehicle body front-and-rear direction is provided almost at the center of the main floor panel 11 in the vehicle body width direction.

Figure 2:
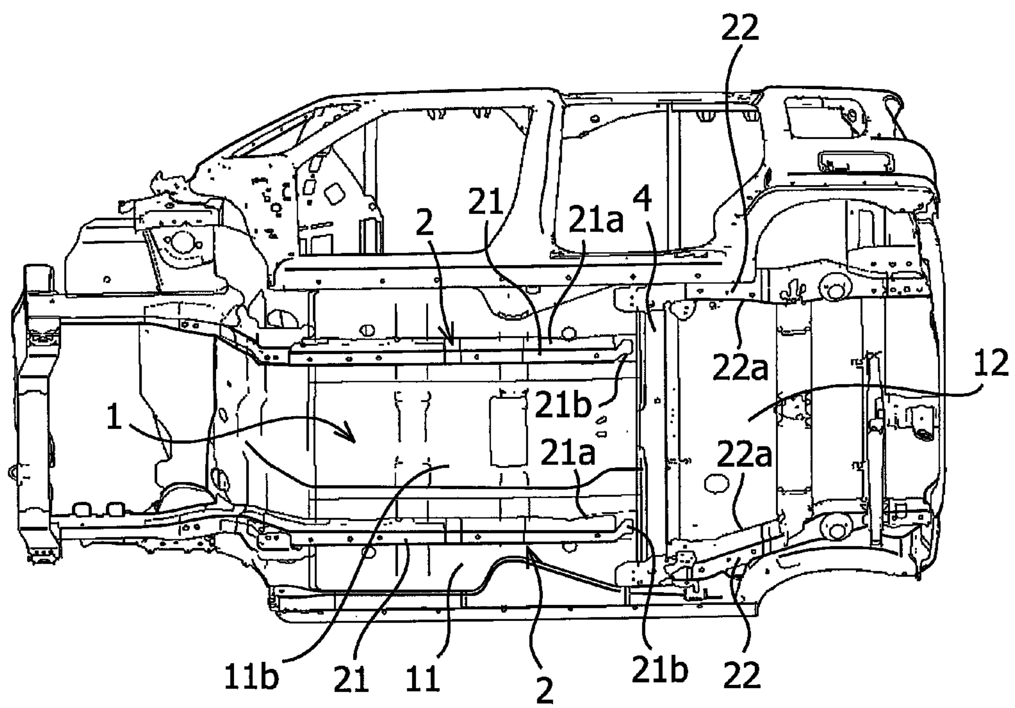
FIG. 2 is a perspective view of an outer side of the vehicle to which the floor frame structure according to the embodiment of the present invention is applied, and which is viewed from below the vehicle body, and shows the floor panels, side members, and a rear-floor cross member.
Figure 3:
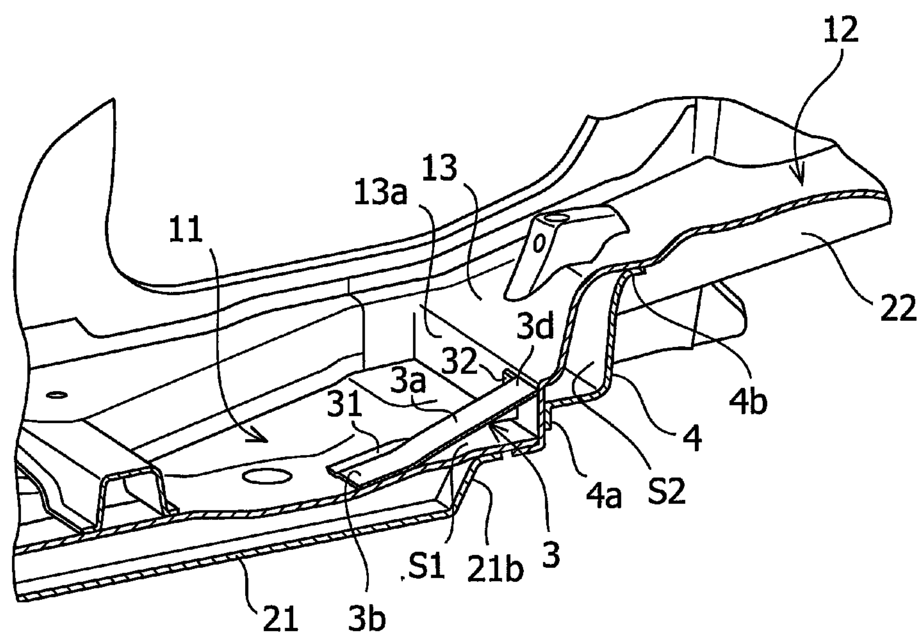
FIG. 3 is a partially exploded perspective view of the floor panel in FIG. 1, and shows a positional relationship between the floor panels, the side member, the reinforcement, and the rear-floor cross member.

Meanwhile, as shown in FIGS. 2 and 3, each of the paired left and right side members 2 includes a floor side member 21 and a rear side member 22 which extend in the vehicle body front-and-rear direction. The floor side member 21 and the rear side member 22 are disposed to be spaced from each other in the vehicle body front-and-rear direction. In other words, each of the side members 2 has a separated structure in which the floor side member 21 and the rear side member 22 are separated from each other. The floor side members 21 are disposed on the main floor panel 11 away from each other in the vehicle body width direction across the floor tunnel 11*b*. Meanwhile, the rear side members 22 are disposed on the rear floor panel 12 away from each other in the vehicle body width direction, and are positioned outward of the corresponding floor side members 21 in the vehicle body.

The floor side members 21 and the rear side members 22 are each formed to have a hat-like cross-sectional shape in the vehicle body width direction. Flange portions 21*a* on both the left and right upper sides of each floor side member 21 are joined to a lower surface of the main floor panel 11 by spot welding or the like. Flange portions 22*a* on both the left and right sides of the rear side member 22 are joined to a lower surface of the rear floor panel 12 by spot welding or the like.

As shown in FIGS. 1 to 4, in this embodiment, a reinforcement 3 extending in the vehicle body front-and-rear direction is disposed above each of the floor side members 21 with the main floor panel 11 interposed therebetween in a stacked manner in the vehicle body vertical direction. An upper surface 3*a* of the reinforcement 3 is formed like an inclined surface which gradually becomes higher toward the rear of the vehicle body. In addition, a front portion 3*b* and lower portions of longitudinal direction side surfaces 3*c* of the reinforcement 3 are joined to an upper surface of the main floor panel 11, whereas a rear end portion 3*d* of the reinforcement 3 is joined to the vertical wall 13*a* formed in the front portion 13 of the rear floor panel 12. As a result, a first closed section space S1 having a triangle shape in a side view is formed on a vehicle body rear side of the main floor panel 11. The first closed section space S1 is enclosed by the main floor panel 11, the vertical wall 13*a* in the front portion 13 of the rear floor panel 12, and the upper surface 3*a* of the reinforcement 3.

Figure 4:
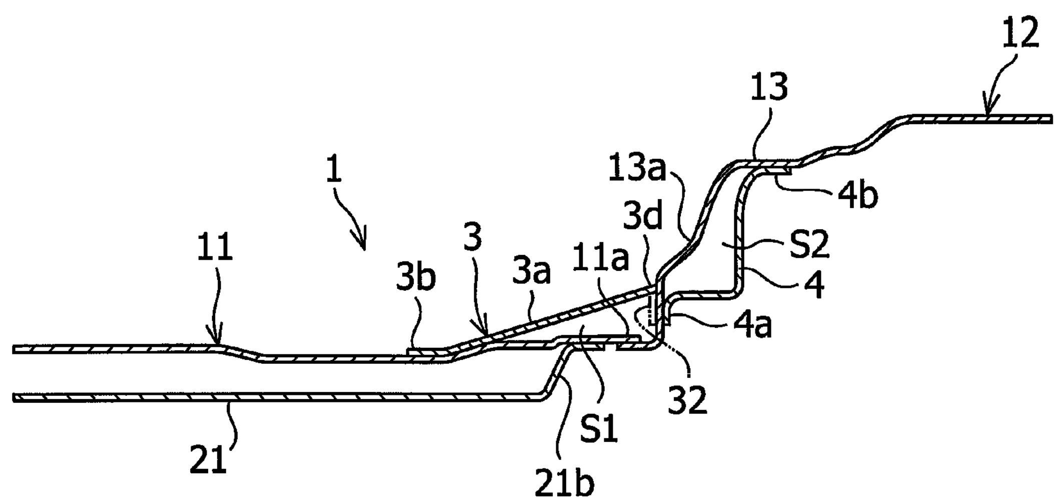
FIG. 4 is a cross-sectional view showing a relationship in which the floor panel, the side member, the reinforcement, and the rear-floor cross member in FIG. 3 are joined together.

Meanwhile, a lower surface portion 21*b* of a rear end of the floor side member 21 is formed like an inclined surface that becomes gradually higher toward the main floor panel 11 as shown in FIGS. 2 to 4. The lower surface portion 21*b* is bent to have a rear end portion which extends almost horizontally and is joined to a lower surface of the rear end portion 11*a* of the main floor panel 11 by spot welding or the like. In addition, the upper surface 3*a* of the reinforcement 3 and the lower surface portion 21*b* of the rear end of the floor side member 21 are inclined at almost the same angles and are formed to have a monotonous cross-sectional shape in a side view.

The reinforcement 3 described above is formed to have a hat-like cross-sectional shape in the vehicle body width direction. Lower flanges 31 extending in the vehicle body width direction are formed in lower portions of the longitudinal direction side surfaces 3*c* on both the left and right sides of the reinforcement 3, respectively. In addition, lateral flanges 32 extending in the vehicle body width direction are formed on both the left and right sides of the rear end portion 3*d* of the reinforcement 3, respectively.

In addition, the lower flanges 31 on both the left and right sides of the reinforcement 3 are disposed at the same positions as the flange portions 21*a* formed on both the left and right sides of the upper portion of the floor side member 21 when viewed in the vehicle body vertical direction. As a result, each of the lower flanges 31 of the reinforcement 3, the main floor panel 11, and the corresponding one of the flange portions 21*a* of the floor side member 21 are joined together by spot welding or the like, while forming a three-layer stack.

In addition, in this embodiment, as shown in FIGS. 2 to 4, a rear-floor front cross member 4 extending in the vehicle body width direction is provided behind the front portion 13 of the rear floor panel 12 in the vehicle body front-and-rear direction. The rear-floor front cross member 4 is joined to the lower surface of the rear floor panel 12, and formed to have an almost L-shaped cross-section in a side view of the vehicle body. A front end flange 4*a* extending downward in the vehicle body is formed in a front end portion of the rear-floor front cross member 4, while a rear-end flange 4*b* extending horizontally toward the rear of the vehicle body is formed in a rear end portion of the rear-floor front cross member 4. In addition, each of the lateral flanges 32 in the rear end portion 3*d* of the reinforcement 3, the vertical wall 13*a* in the front portion 13 of the rear floor panel 12, and the front end flange 4*a* of the rear-floor front cross member 4 are joined together by spot welding or the like, while forming a three-layer stack. As a result, a second closed section space S2 having a triangle shape in a side view is formed on front side of the rear floor panel 12 in the vehicle body. The second closed section space S2 is enclosed by the vertical wall 13*a* in the front portion 13 of the rear floor panel 12, and the rear-floor front cross member 4.

The second closed section space S2 is disposed adjacent to the first closed section space S1. Moreover, the first closed section space S1 and the second closed section space S2 are formed to have cross sectional shapes that change continuously in the vehicle body front-and-rear direction and in the vertical direction, as shown in FIGS. 3 and 4.

Figure 5:
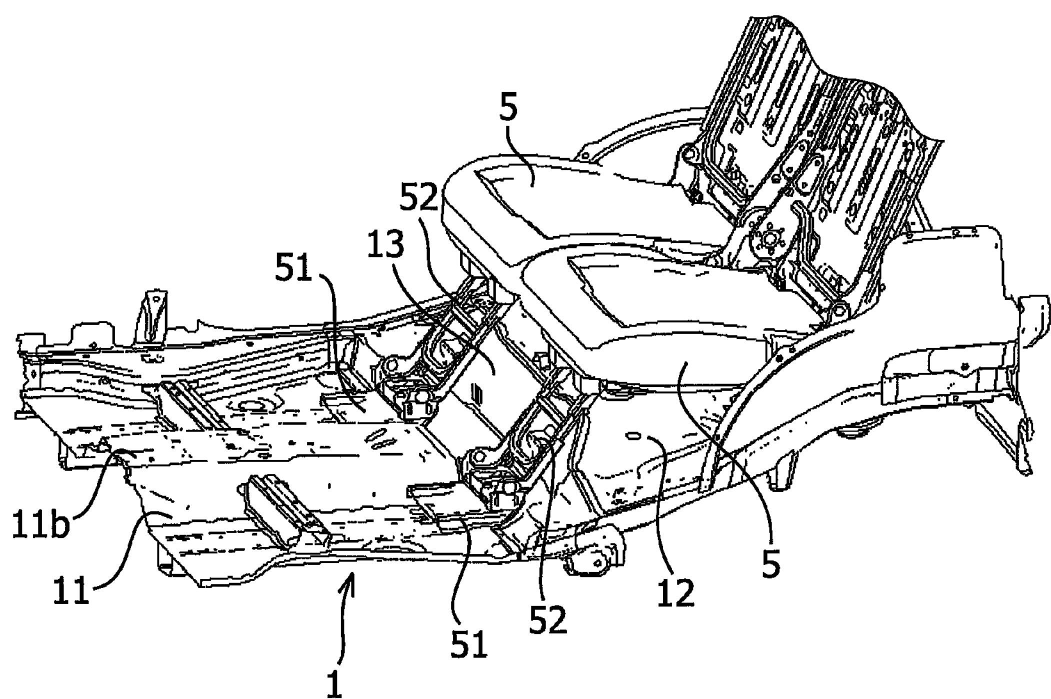
FIG. 5 is a perspective view showing attachment portions for rear seats of the vehicle to which the floor frame structure according to the embodiment of the present invention is applied.

Note that, as shown in FIG. 5, each of the reinforcements 3 is provided with an attachment portion 51 for a rear seat 5 to be mounted on the rear floor panel 12 in the rear side of the vehicle body. The rear seat 5 is a foldable seat which is rotated frontward in the vehicle body about a rotation axis of a leg portion 52 with a seat back folded onto a seat cushion and is maintained in an upright position when not in use. The attachment portion 51 provided at a lower end of the leg portion 52 is designed to be joined to the reinforcements 3 having a high rigidity.

As described above, in the vehicle floor frame structure according to the embodiment of the present invention, each of the reinforcements 3 having a high rigidity is formed to have the hat-like cross-sectional shape in the vehicle body width direction, and also to have the upper surface 3*a* which is higher toward the rear of the vehicle body. The reinforcement 3 is disposed above the floor side member 21 with the main floor panel 11 interposed therebetween in a stacked manner. The front portion 3*b* and the lower portions of the side surfaces 3*c* of the reinforcement 3 are joined to the upper surface of the main floor panel 11, and disposed above the floor side members 21 in a stacked manner. The rear end portion 3*d* of the reinforcement 3 is joined to the vertical wall 13*a* in the front portion 13 of the rear floor panel 12. Thus, the first closed section space S1 is formed which is enclosed by the main floor panel 11, the front portion 13 of the rear floor panel 12, and the reinforcement 3. The lower surface portion 21*b* of the rear end of each of the floor side members 21 becomes gradually higher toward the main floor panel 11. The upper surface 3*a* of the reinforcement 3 and the lower surface portion 21*b* of the floor side member 21 are included at almost the same angles and are formed to have a monotonous cross-sectional shape in a side view. Therefore, the rigidity of the front portion 13 of the rear floor panel 12 can be increased. Moreover, when a load from the front side of the vehicle body is applied to the main floor panel 11 and the floor side members 21, the floor frame structure of the present invention can smoothly transmit the load on the floor side members 21 to the rear floor panel 12 in the rear side of the vehicle body to disperse the load from the front side of the vehicle body over the rear floor panel 12 in the rear side of the vehicle body. As a result, the floor frame structure can prevent the buckling deformation of the front portion 13 of the rear floor panel 12 due to the load from the front side of the vehicle body while avoiding stress concentration in the front portion 13 of the rear floor panel 12.

In addition, in the floor frame structure of this embodiment, the rear-floor front cross member 4 having the nearly L-shaped cross-section and being joined to the lower surface of the rear floor panel 12 is provided behind the front portion 13 of the rear floor panel 12 in the vehicle body front-and-rear direction. Thus, in a side view, the second closed section space S2 is formed which is enclosed by the rear floor panel 12 and the rear-floor front cross member 4. The second closed section space S2 and the first closed section space S1 are disposed adjacent to each other, and are formed to have the cross-sectional shapes that change continuously in the vehicle body front-and-rear and vertical directions. Hence, the closed section spaces S1 and S2 act more cooperatively, so that the load to the floor side members 21 is efficiently transmitted to the highly rigid closed section portions S1 and S2 of the front portion 13 of the rear floor panel 12. As a result, the load from the front side of the vehicle body can be dispersed over, and thus efficiently absorbed by, many members in the rear side of the vehicle body.

Moreover, in the floor frame structure of this embodiment, the lower flanges 31 on both the left and right sides of each of the reinforcements 3 are disposed at the same positions as the flange portions 21*a* of the corresponding one of the floor side members 21 when viewed in the vehicle body vertical direction. Each of the lower flanges 31 of the reinforcement 3, the main floor panel 11, and the corresponding one of the flange portions 21*a* of the floor side member 21 are joined together, while forming a three-layer stack. Moreover, each of the lateral flanges 32 on both the left and right sides of the rear end portion 3*d* of the reinforcement 3, the vertical wall 13*a* in the front portion 13 of the rear floor panel 12, and the front end flange 4*a* of the rear-floor front cross member 4 are joined together, while forming a three-layer stack. Therefore, the joining strength of the three joined members can be improved, so that the floor frame structure of this embodiment can absorb the load from the front of the vehicle body while retaining the cross-sectional shapes of the closed section spaces.

Hereinabove, an embodiment of the present invention is described. However, the present invention is not limited to the above-described embodiment, and it can be modified or altered in various ways on the basis of the technical ideas of the present invention.

For example, regarding the shape of the reinforcements 3 in the above-described embodiment, the cross-sectional shape thereof in the vehicle body width direction is not limited to the hat-like shape, but can be selected from various shapes, as long as the reinforcements 3 can be joined to the upper surface of the main floor panel 11 and to the front portion 13 of the rear floor panel 12.

What is claimed is:

1. A vehicle floor frame structure comprising:

a floor panel provided in a lower portion of a vehicle body and having a main floor panel and a rear floor panel; and side members provided at both sides of the floor panel in a vehicle body width direction, and each having a floor side member and a rear side member which extend in a vehicle body front-and-rear direction, the floor side member being provided on the main floor panel, the rear side member being provided on the rear floor panel, the floor side members are disposed on the main floor panel away from each other in a vehicle body width direction across a floor tunnel, wherein a reinforcement extending in the vehicle body front-and-rear direction is disposed above each of the floor side members in a vehicle body vertical direction with the main floor panel interposed therebetween in a stacked manner, an upper surface of the reinforcement is formed to become higher toward a rear of the vehicle body, a front portion and lower portions of longitudinal direction side surfaces of the reinforcement are joined to an upper surface of the main floor panel, and a rear end of the reinforcement is joined to a vertical wall formed in a front portion of the rear floor panel, whereby a first closed section space enclosed by the main floor panel, the front portion of the rear floor panel, and the reinforcement is formed in a side view, the first closed section space is formed in a triangle shape in a side view, and a lower surface of a rear end of the floor side member is formed to become gradually higher toward the main floor panel, and an upper surface of the reinforcement and the lower surface at the rear end of the floor side member are inclined at almost the same angles and are formed to have a monotonous cross-sectional shape in a side view, wherein a rear-floor front cross member extending in the vehicle body width direction is provided behind the front portion of the rear floor panel in the vehicle body front-and-rear direction, the rear-floor front cross member is joined to a lower surface of the rear floor panel to form a second closed section space in a side view, the second closed section space enclosed by the rear floor panel and the rear-floor front cross member, and the second closed section space is disposed adjacent to the first closed section space, wherein the first closed section space and the second closed section space are formed to have cross-sectional shapes which change continuously in the vehicle body front-and-rear and vertical directions, and wherein the second closed section space is disposed in the rear side and in the upper side of the vehicle body with respect to the first closed section space.

2. The vehicle floor frame structure according to claim 1, wherein the cross-sectional shape of the reinforcement taken along the vehicle body width direction is formed in a hat shape, lower flanges on both left and right sides of the reinforcement are disposed at the same positions as flanges formed in an upper portion of the floor side member, respectively, when viewed in the vehicle body vertical direction, and each of the lower flanges of the reinforcement, the main floor panel, and the corresponding one of the flanges of the floor side member are joined together, while forming a three-layer stack.

3. The vehicle floor frame structure according to claim 1, wherein lateral flanges extending in the vehicle body width direction are formed on both left and right sides of a rear end portion of the reinforcement, respectively, a flange extending downward in the vehicle body is formed in a front end portion of the rear-floor front cross member, and each of the lateral flanges of the reinforcement, the vertical wall of the front portion of the rear floor panel, and the flange of the rear-floor front cross member are joined together, while forming a three-layer stack.

4. The vehicle floor frame structure according to claim 1, wherein the reinforcement is provided with an attachment portion for a rear seat.

* * * * *